April 22, 1958     A. KORSMO ET AL     2,831,307
DETACHABLE TWO-ROW TRACTOR MOUNTED CORN PICKER
Filed Nov. 13, 1953     13 Sheets-Sheet 1
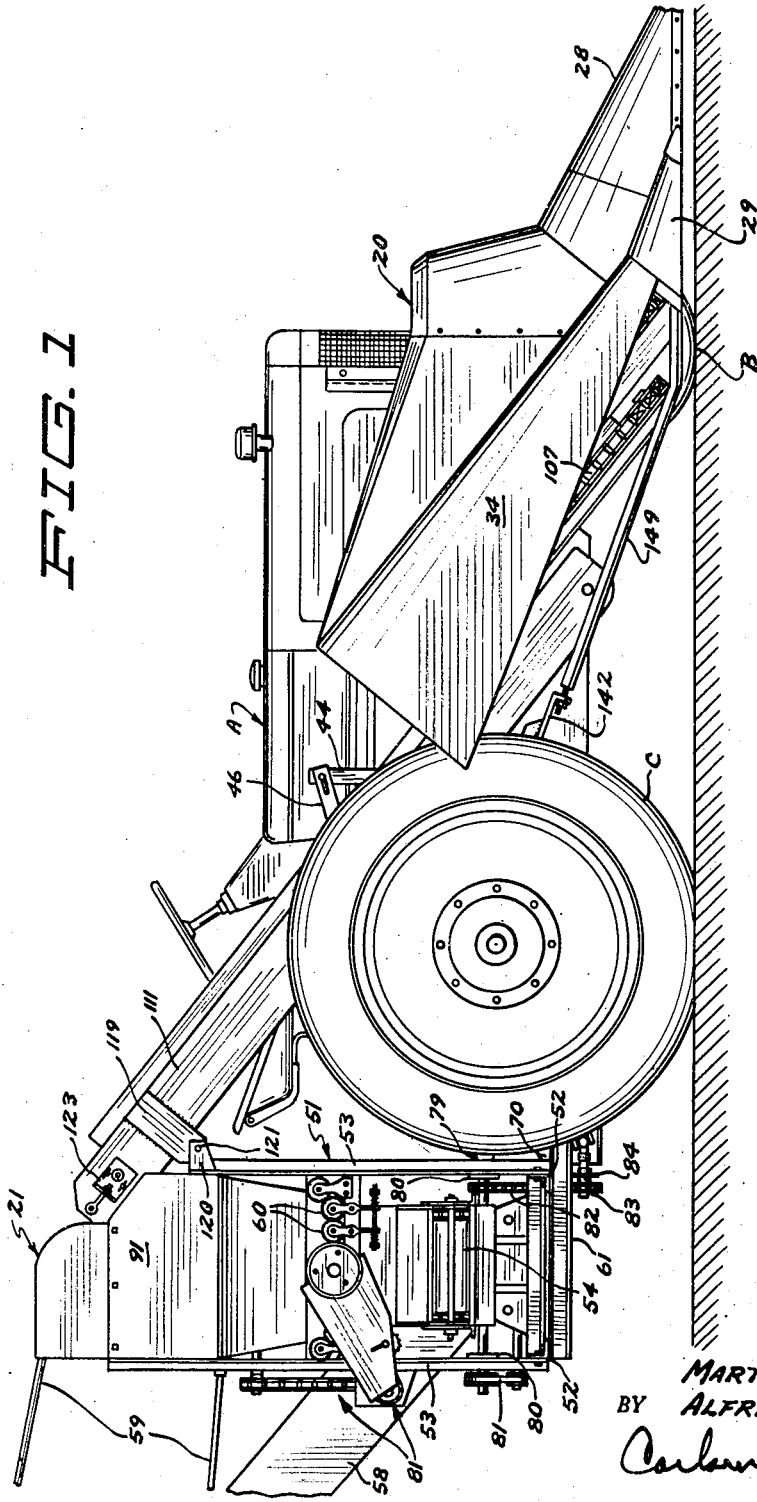
INVENTOR.
MARTIN RONNING
BY ALFRED KORSMO
ATTORNEYS

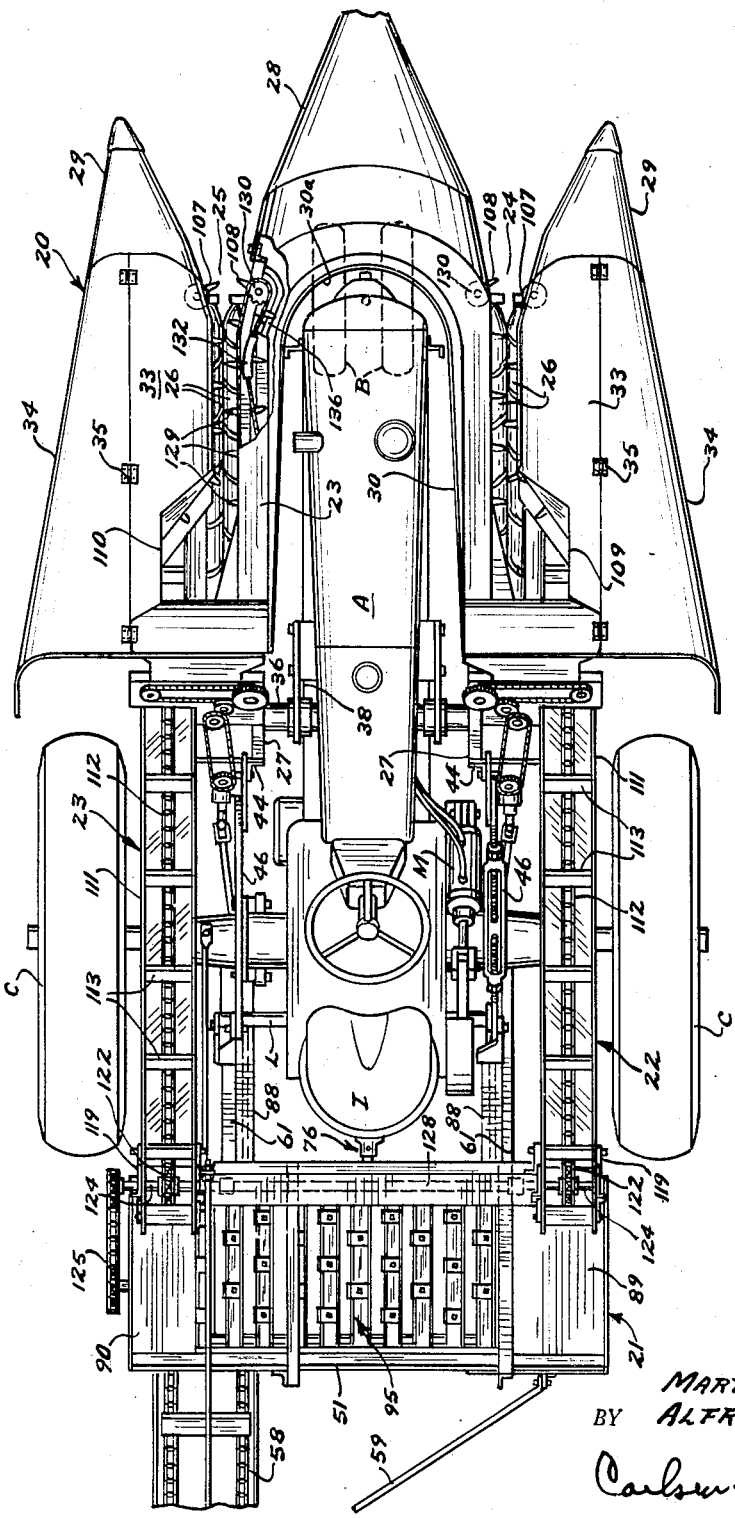

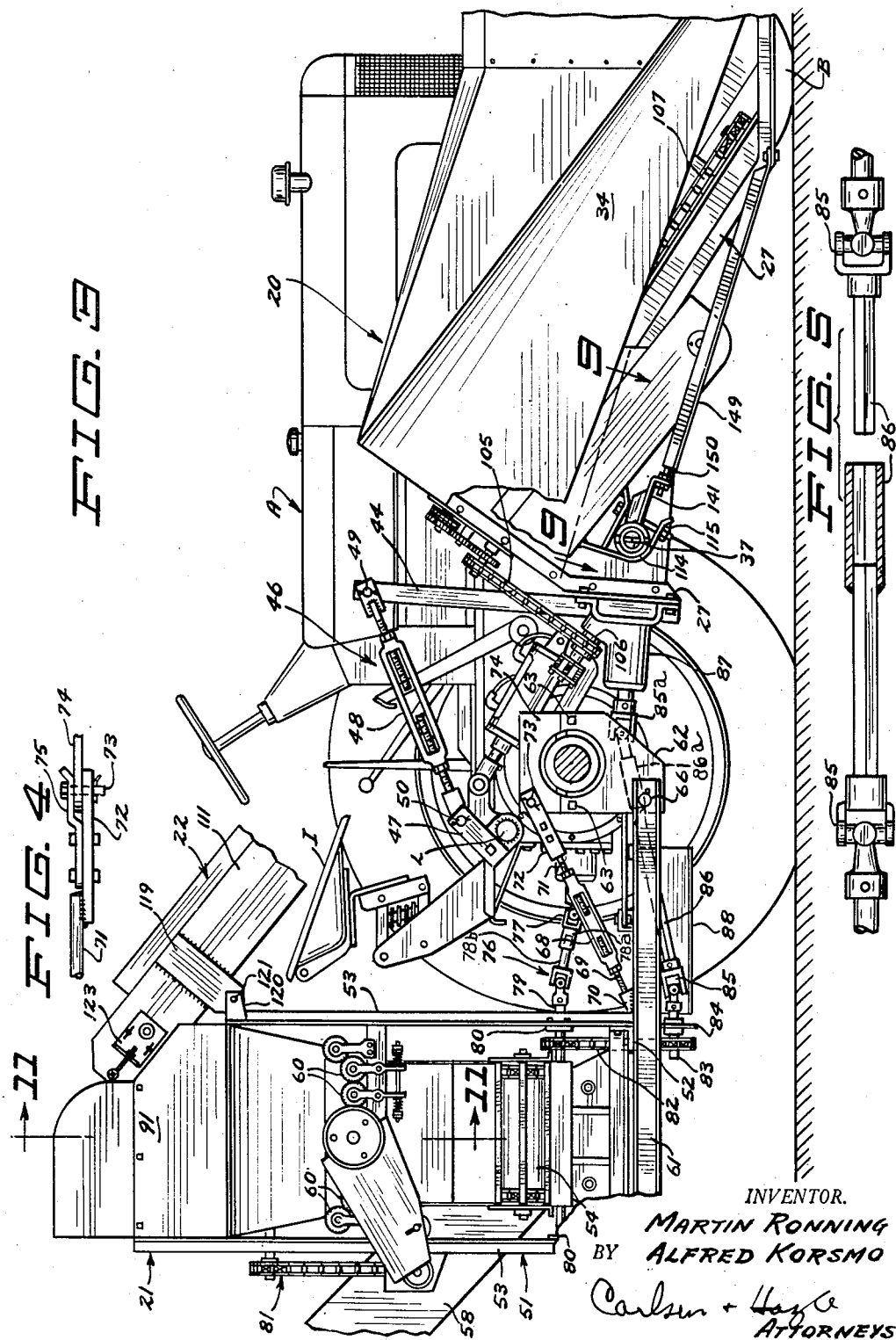

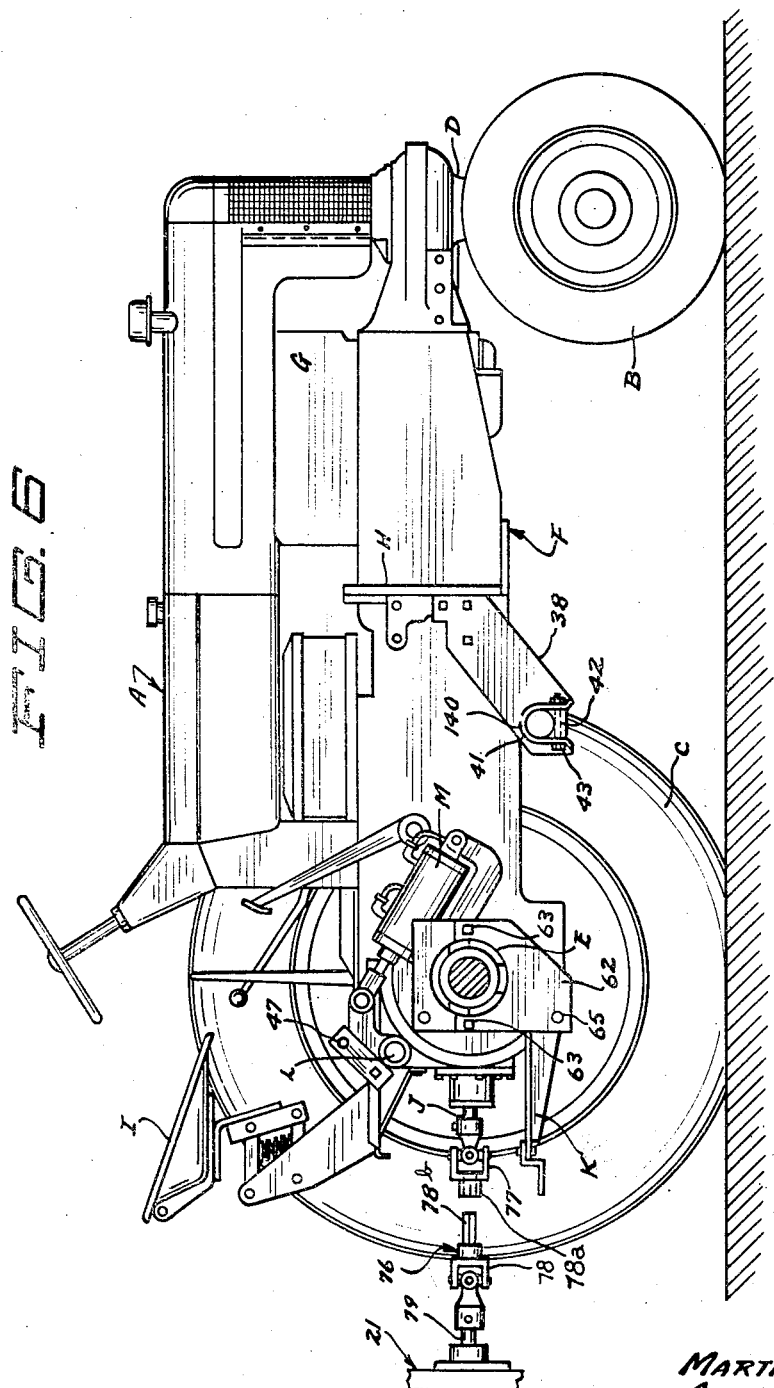

April 22, 1958 A. KORSMO ET AL 2,831,307
DETACHABLE TWO-ROW TRACTOR MOUNTED CORN PICKER
Filed Nov. 13, 1953 13 Sheets-Sheet 5
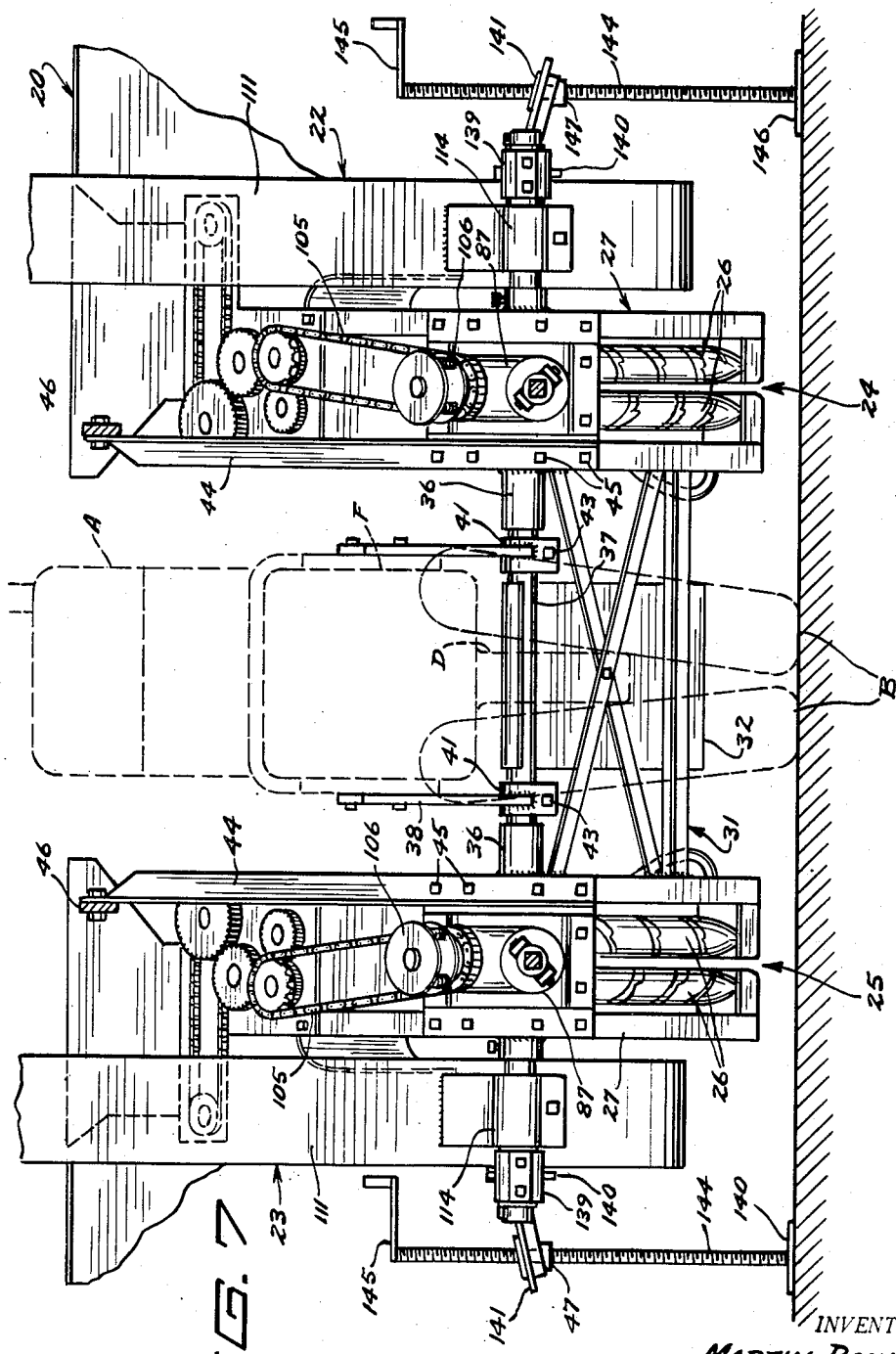
INVENTOR.
MARTIN RONNING
BY ALFRED KORSMO
ATTORNEYS April 22, 1958 A. KORSMO ET AL 2,831,307
DETACHABLE TWO-ROW TRACTOR MOUNTED CORN PICKER
Filed Nov. 13, 1953 13 Sheets-Sheet 6
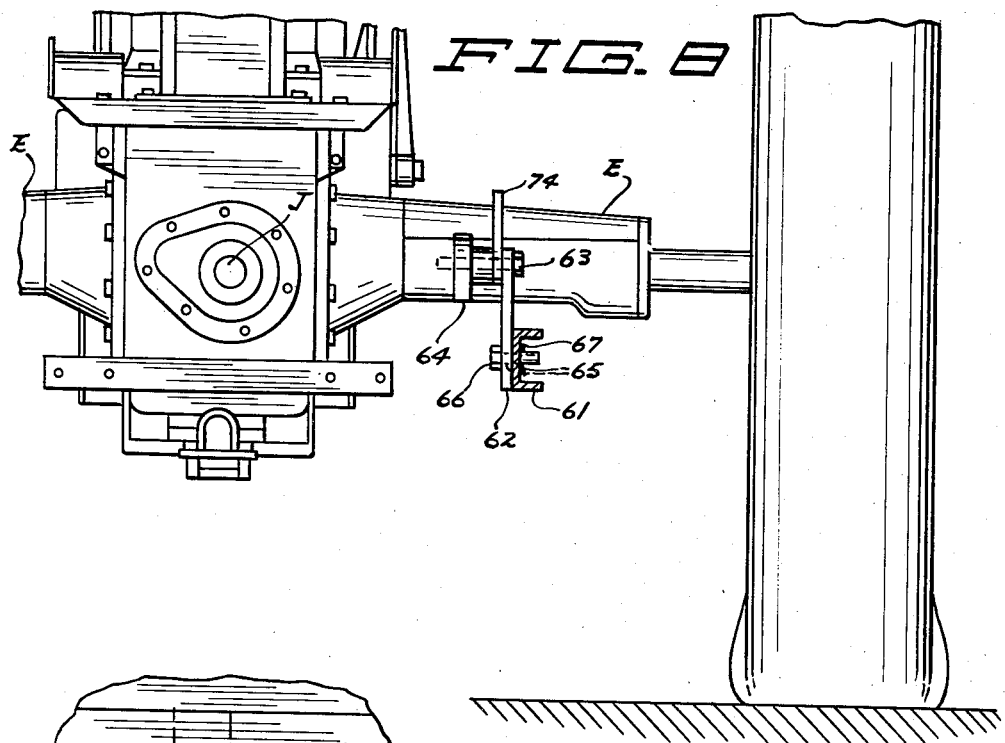
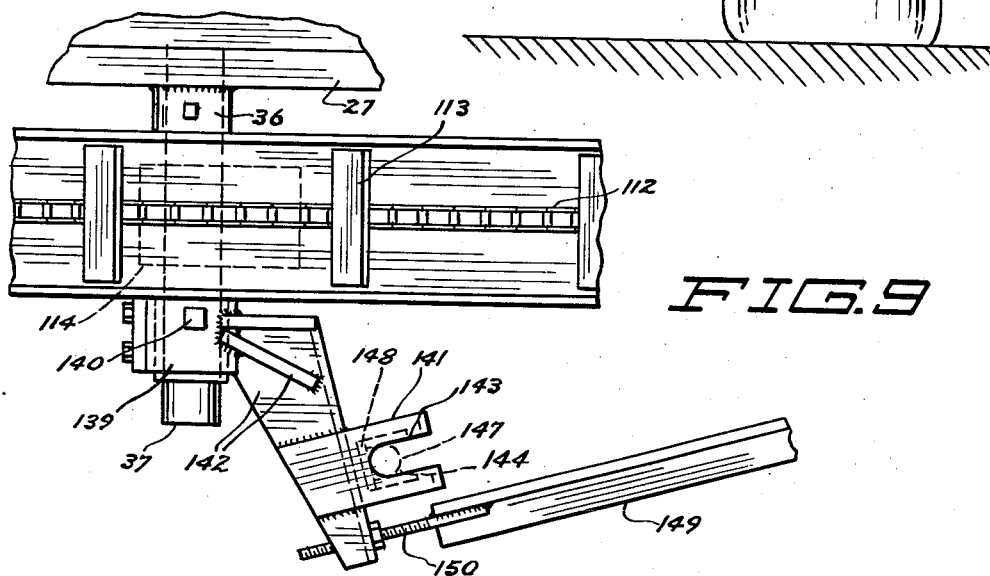
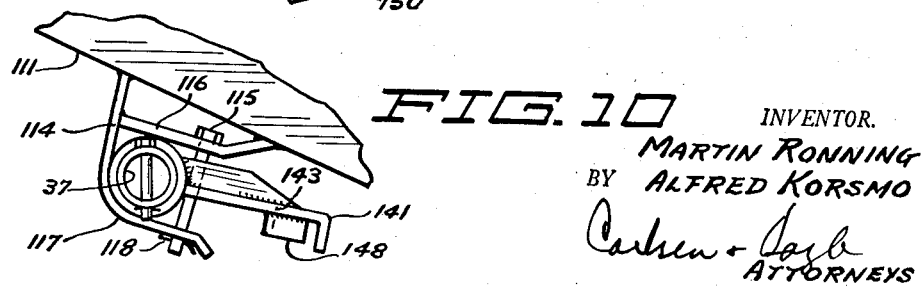
INVENTOR.
MARTIN RONNING
BY ALFRED KORSMO
ATTORNEYS

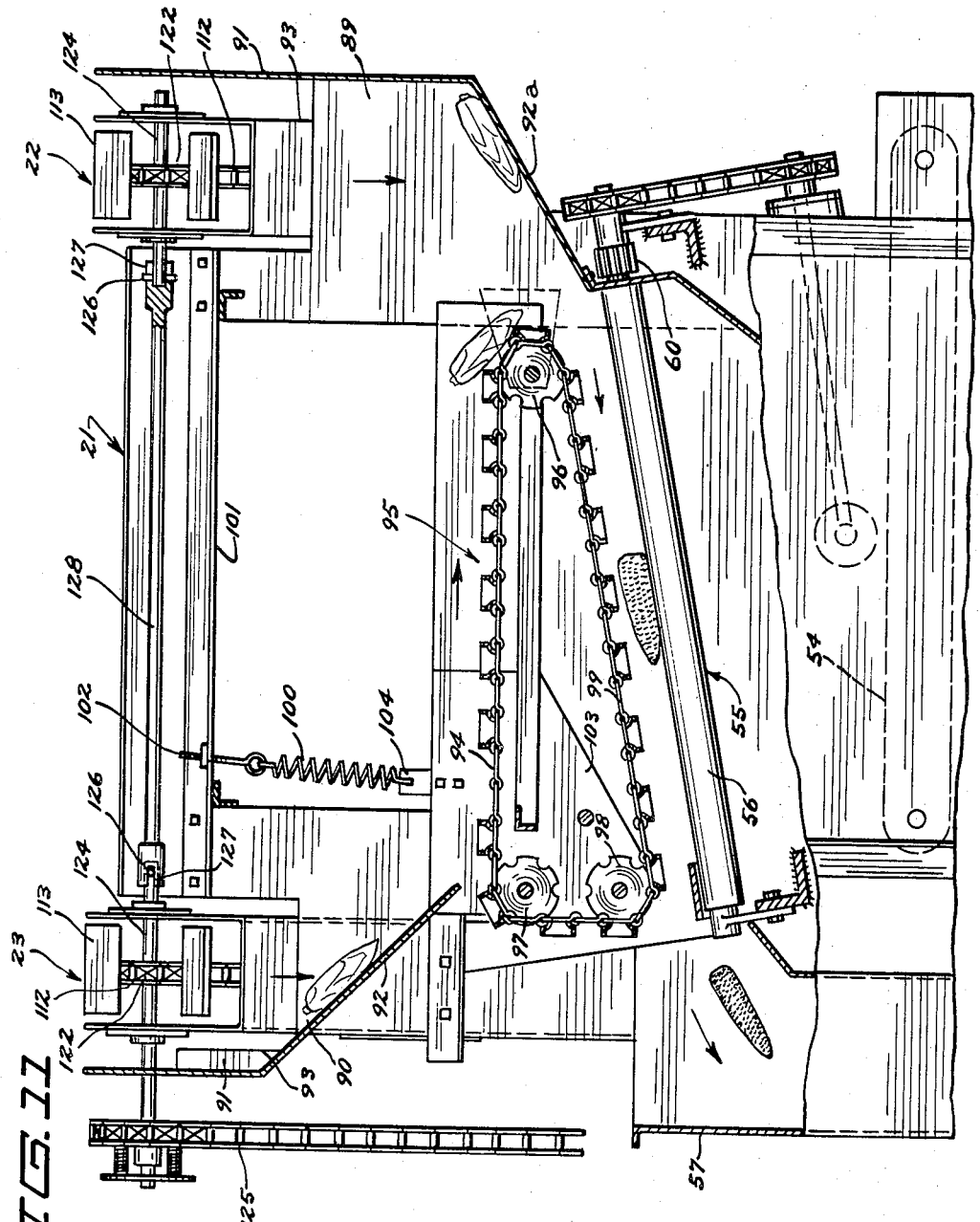

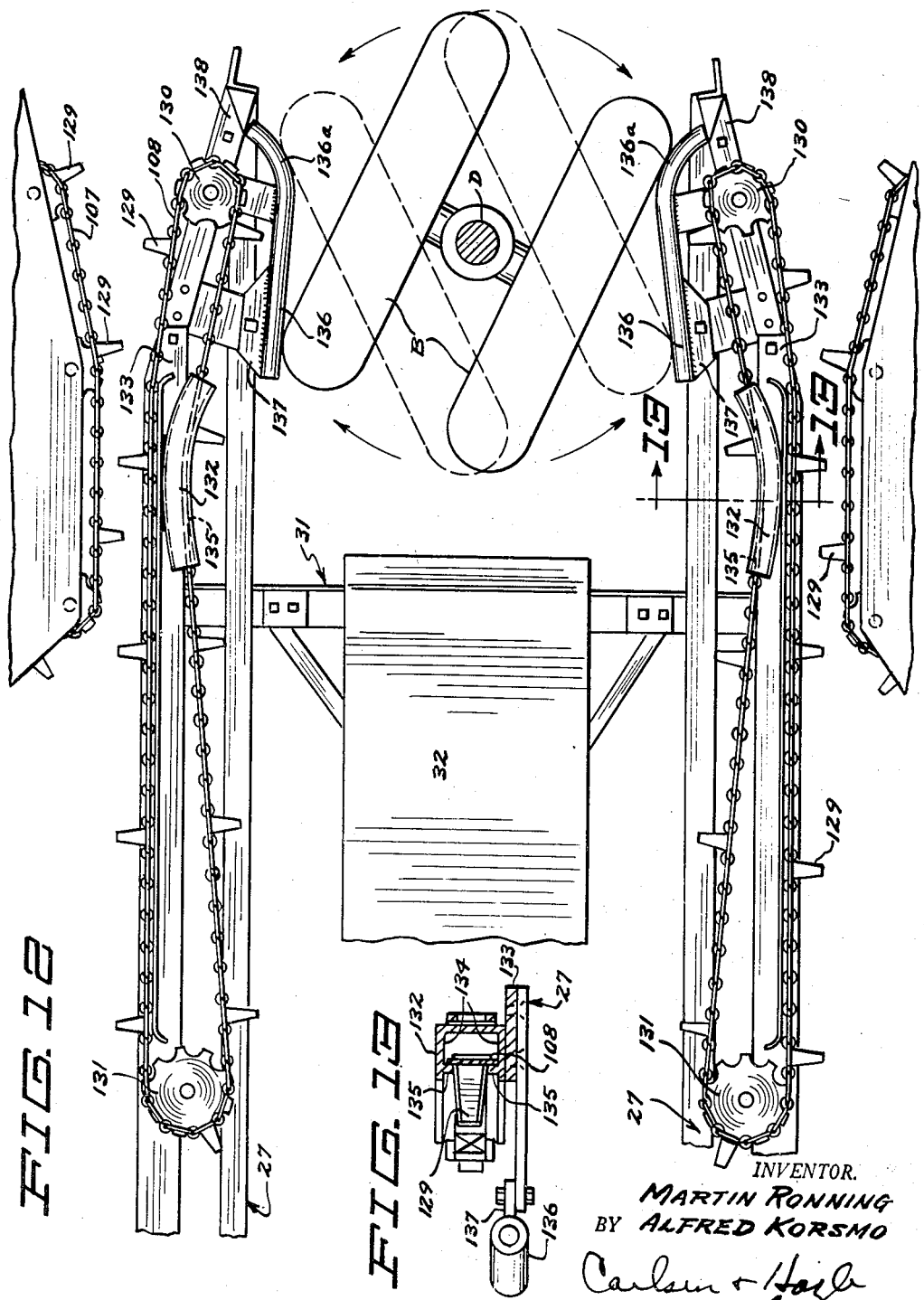

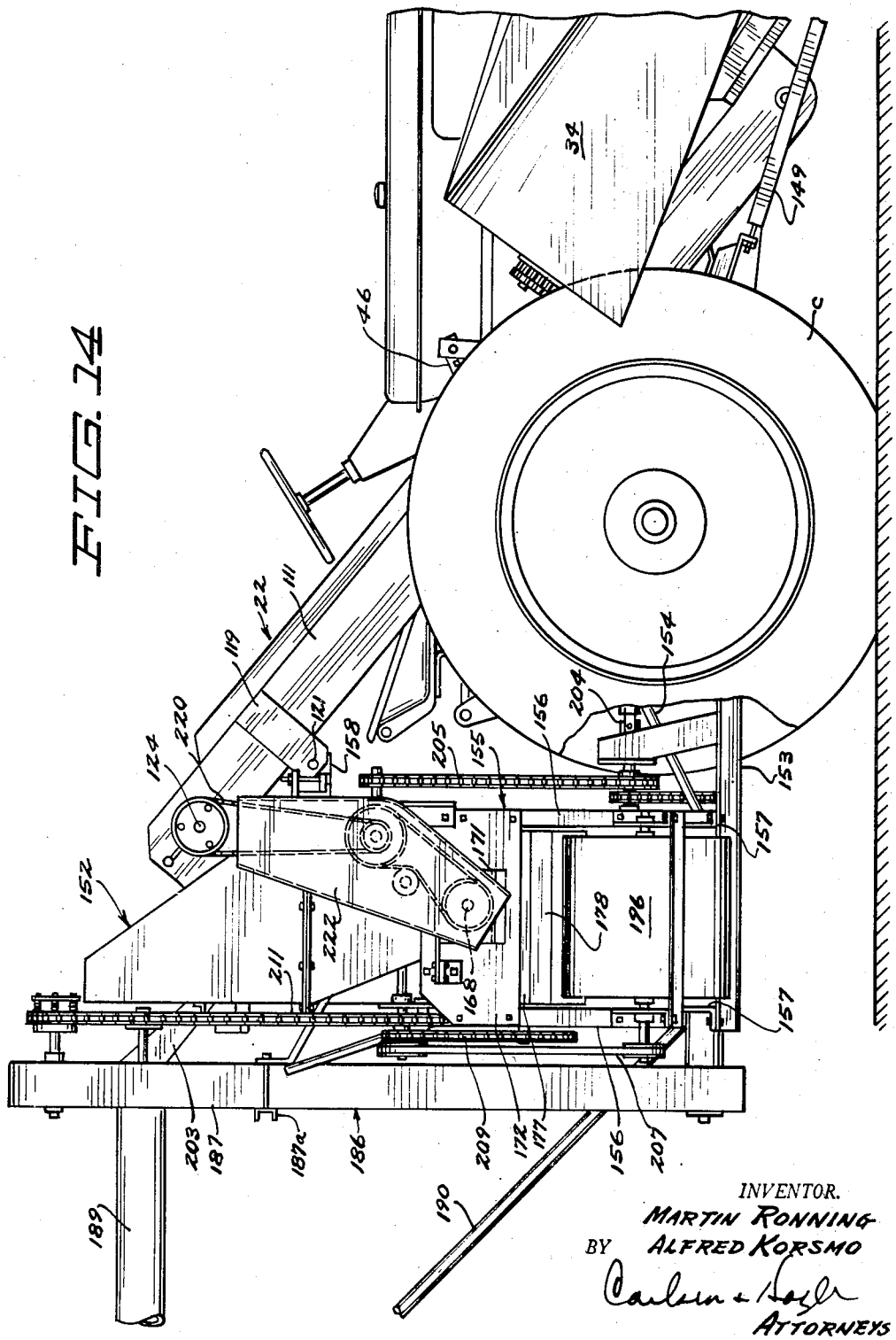

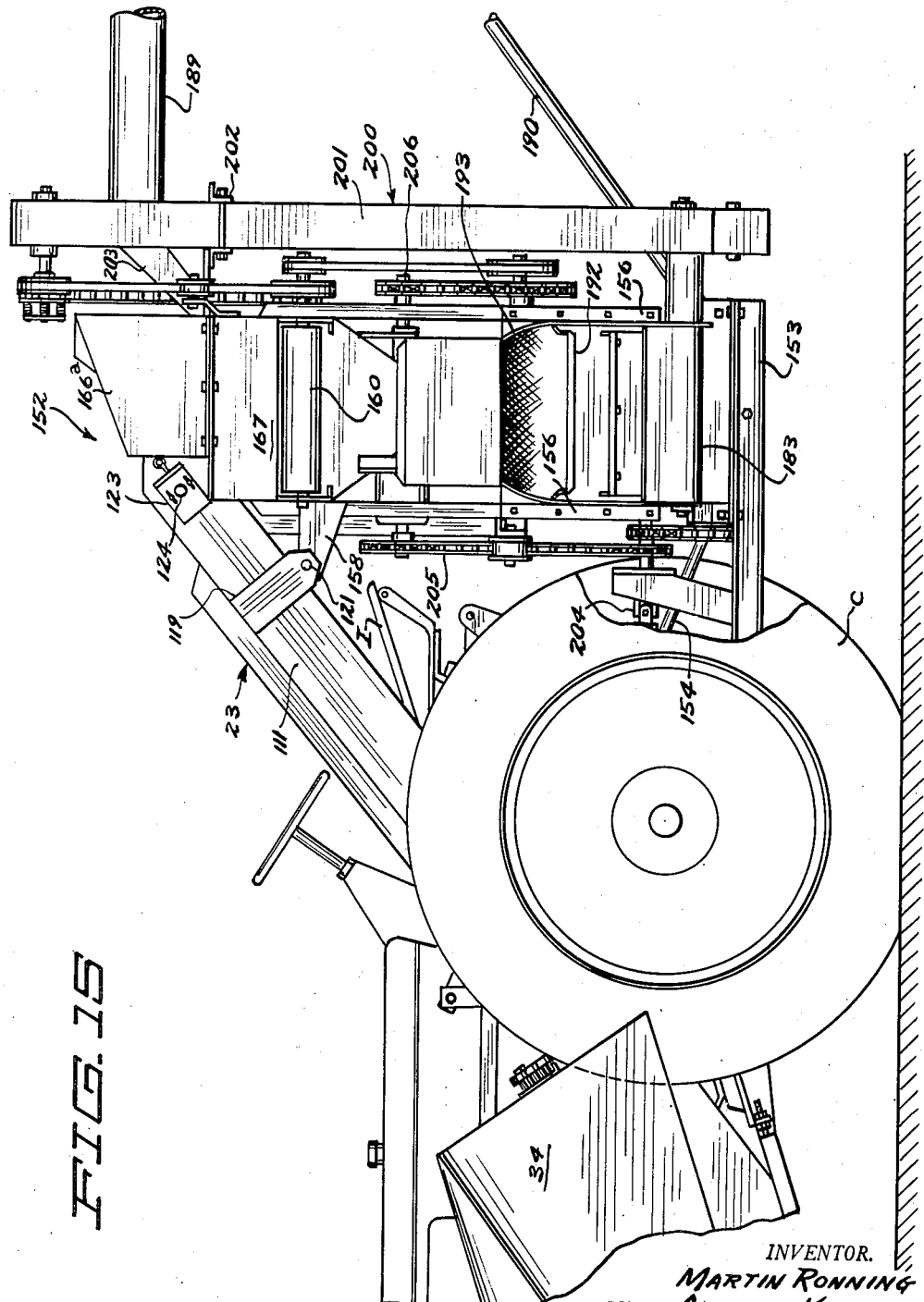

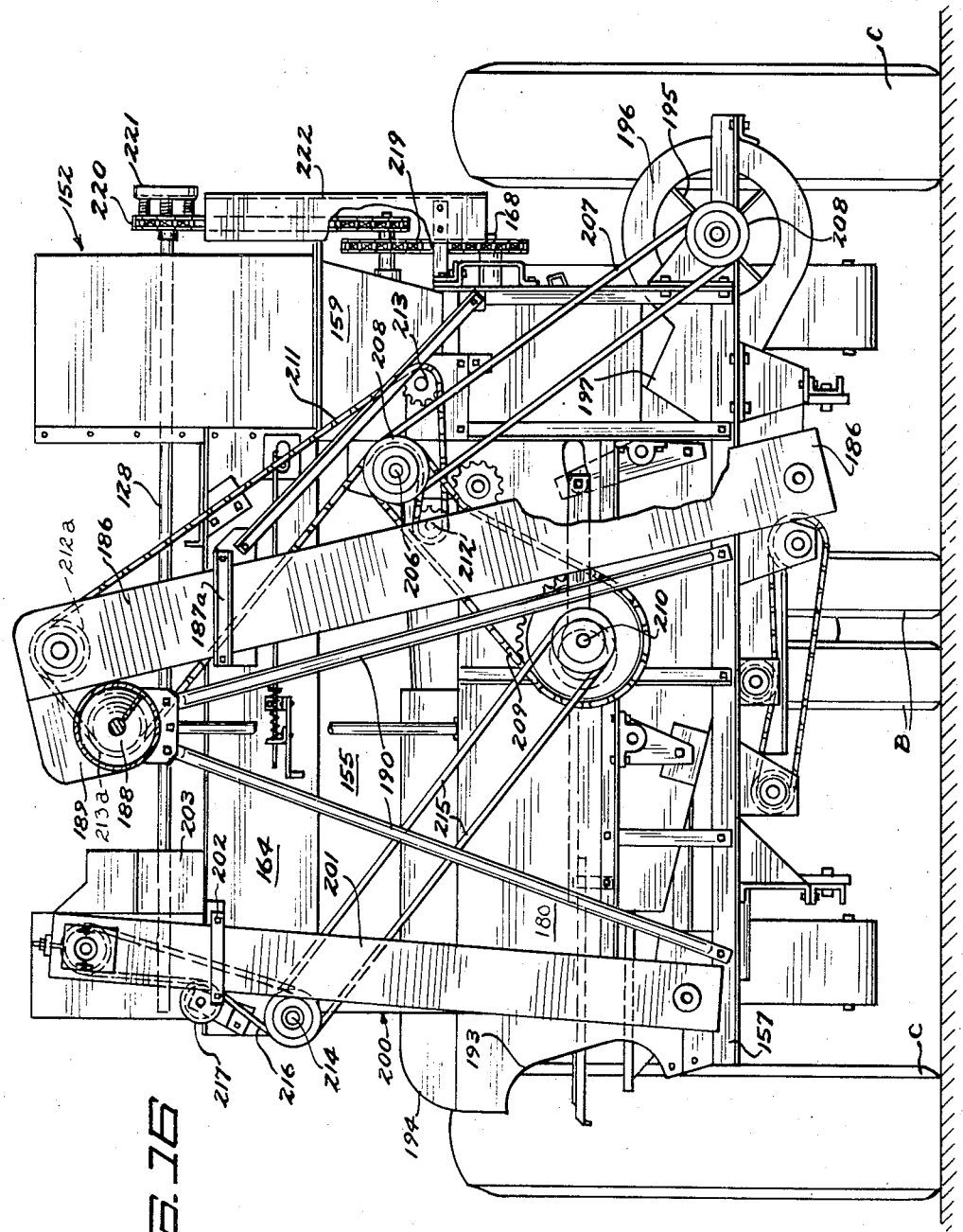

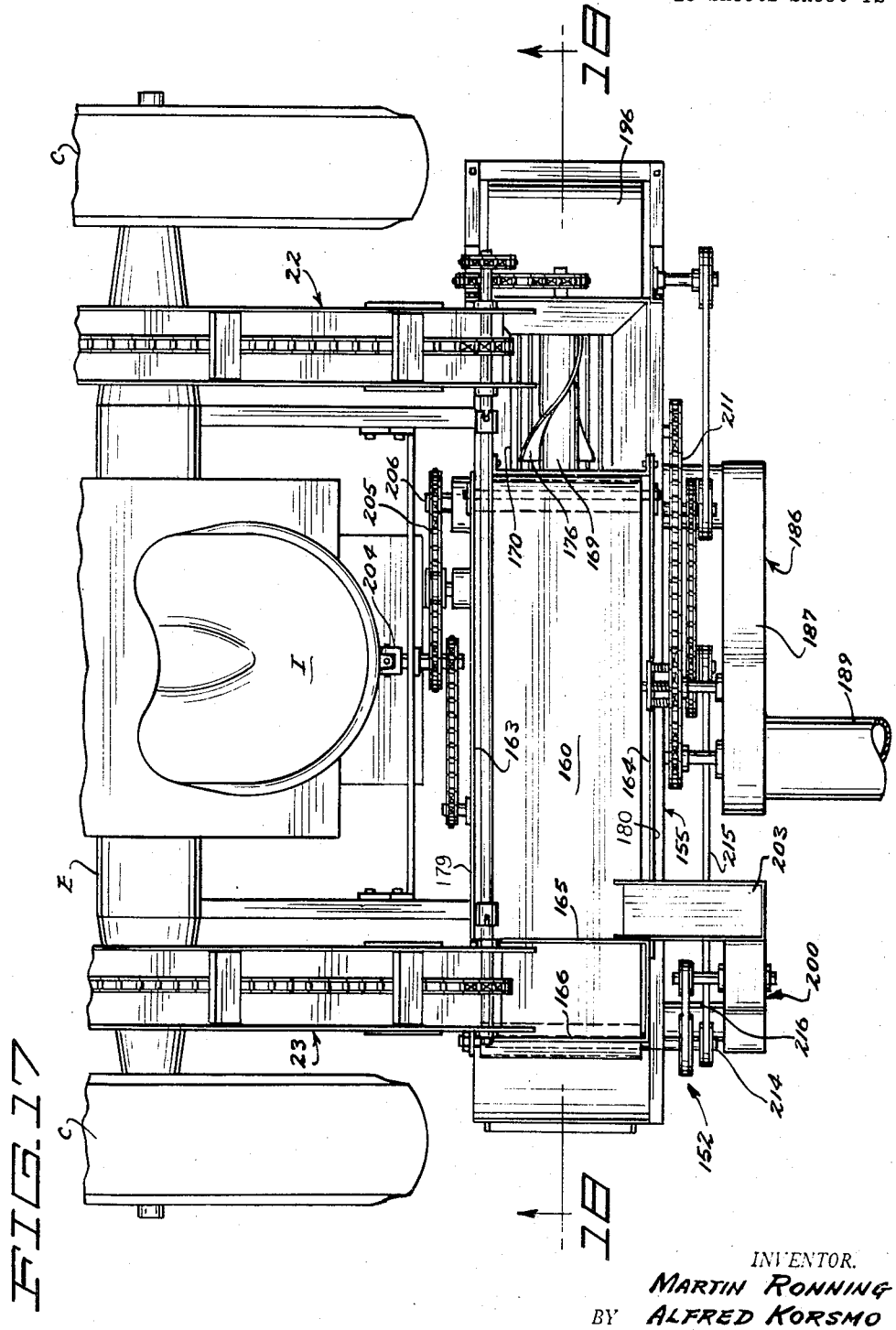

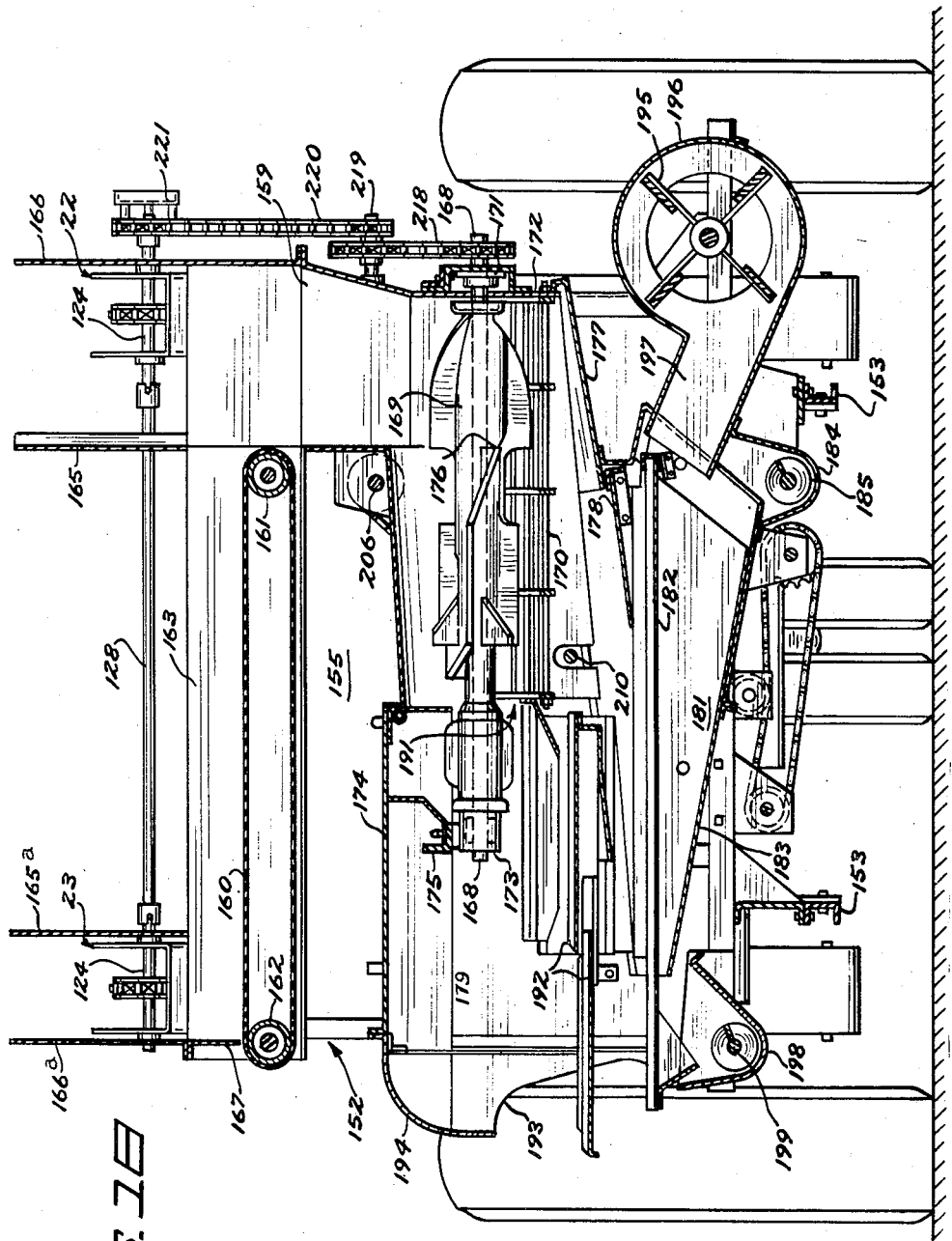

United States Patent Office 2,831,307
Patented Apr. 22, 1958

2,831,307

DETACHABLE TWO-ROW TRACTOR MOUNTED CORN PICKER

Alfred Korsmo, Hopkins, and Martin Ronning, Minneapolis, Minn., assignors to Minneapolis-Moline Company, Hopkins, Minn., a corporation of Minnesota Application November 13, 1953, Serial No. 391,986

4 Claims. (Cl. 56—2)

This invention relates generally to improvements in corn pickers and the primary object is to provide a two-row picker which may be mounted in its entirety on, and operated by, a row crop farm tractor.

Corn pickers of this general type have certain advantages over the more common pull-behind types of equipment in that the corn is picked in advance of the tractor so that there is less damage in opening up a field, and for the reason that the operator of the tractor, being located between the respective picking mechanisms, is in a position to best observe the operation thereof and properly maneuver the machine. Furthermore, such mounted types of corn pickers are relatively quite compact so that they may be turned on short radii and transported from field to field without difficulty, the latter particularly because the picker is but very little wider than the tread of the tractor itself. Furthermore, these mounted pickers are comparatively inexpensive since they require no supporting wheels and attendant axles and framing, being wholly supported upon the tractor itself, and, of course, when the picker is not in use it may be removed and the tractor used for any of the many other purposes around the farm.

It is extremely desirable, however, that the various operating elements of the picker be readily attachable to and detachable from the tractor and as a further object of our invention we provide a mounted type of corn picker made up of only four main units consisting of a two-row picker assembly, which in use is mounted in a wrap-around fashion at both sides and the front of the tractor, and a rearwardly located husking unit supported at the rear of the tractor. The two remaining units then consist of side mounted elevators by which the snapped ears of corn are delivered upwardly and rearwardly from the picking to the husking units. Considering as an example the removal of these units from the tractor, it is only necessary in accordance with our invention to first remove the two side elevators and lay them away, following which a support is placed beneath the husking unit and the connections between the same and the tractor are detached and the tractor driven away. The picker unit is then freed from the tractor, the latter is backed out, and there remains then only very minor connecting linkage and drive mechanism for removal and storage while the picker is not in use.

Further in accordance with our invention, and as an object thereof, we contemplate the substitution for the husking unit of a sheller which may be mounted in the same fashion upon the tractor and will then deliver the corn in a shelled condition.

Another object of our invention is to provide various structural refinements in the construction and support of mounted type corn pickers, among which is the provision for guiding of the gathering chains of the picking unit so that space is provided for the dirigible movements of the front wheels of the tractor without any sacrifice in the overall length of the picking elements.

These and other more detailed and specific objects will be disclosed in the course of the following specification, reference being had to the accompanying drawings, in which—

Fig. 1 is a side elevation of the corn picker as mounted upon a row crop tractor, viewing the same from the right hand side and with the major part of the wagon elevator and its bracing or supporting elements broken away.

Fig. 2 is a top plan view of the tractor and picker as seen in Fig. 1.

Fig. 3 is an enlarged side elevation of the picker, with front and rear portions thereof omitted and with the near tractor wheel, as well as certain parts of the corn picker itself, broken away to better disclose the construction and assembly.

Fig. 4 is an enlarged detail plan view of one of the connections between the husking unit and the tractor.

Fig. 5 is an enlarged detail view of the slip shaft connection for the power take-off.

Fig. 6 is a side view of the tractor itself, as arranged for the support and operation of the corn picker, the near traction wheel being removed.

Fig. 7 is a rear end view of the picker unit, with the tractor outline in dotted lines and showing the support jacks.

Fig. 8 is an enlarged rear end view of the tractor, with one of the husker unit supports in section.

Fig. 9 is an enlarged fragmentary plan view along line 9—9 in Fig. 3.

Fig. 10 is an enlarged detail side view of the support saddle for the lower end of one of the side conveyors.

Fig. 11 is an enlarged detail cross section through the husker unit, along line 11—11 in Fig. 3 with parts broken away.

Fig. 12 is an enlarged detail plan view and section of the lower front part of the picker, showing the gathering chain guides and front wheel bumpers.

Fig. 13 is a still further enlarged detail cross section along line 13—13 in Fig. 12, showing the chain guide.

Figs. 14 and 15 are opposite side elevations of the rear portion of the machine with a shelling unit substituted for the husking unit, parts being broken away in each view.

Fig. 16 is a rear end view of the shelling unit.

Fig. 17 is a plan view of the shelling unit.

Fig. 18 is a vertical cross sectional view along the line 18—18 in Fig. 17.

Referring now more particularly and by reference characters to the drawing, it will be seen that the corn picker is assembled upon, and in conjunction with, an ordinary row crop farm tractor, designated generally at A, having close spaced forwardly located steerable wheels B and relatively wide spaced rear traction wheels C. The wheels B pivot about the upright axis of a pedestal D for steering purposes, whereas the wheels C are operated by a live axle contained in a generally transversely extending horizontal rear axle housing E. In accordance with the customary construction of these tractors the axle housing E forms a part of a forwardly and rearwardly extending crankcase and transmission casing F, which forms in effect the chassis of the tractor, and these elements, rearwardly of the engine G, have bolted together flanges H. The operator's seat I is located above and to the rear of the rear axle and projecting from the rear end of the chassis is the usual power take-off shaft J by which the various implements used with tractors are powered wherever necessary. In addition the tractor has a draw bar K by which pull-behind type of equipment may be connected for draft purposes. Further in accordance with modern practice there is a rearwardly located, transversely extending rock shaft or lifting roll L which may be oscillated by means of a hydraulic lift fluid motor M, as clearly shown in Fig. 4, so that implements connected to this shaft may be raised and lowered by hydraulic power. For the application to this type of tractor of our improved corn picker various attachments and fixtures are needed, but these will be described in the order in which they occur in the following description of the corn picker itself.

The corn picker consists of four main units or assemblies made up of a forwardly located picker unit, designated generally at 20, a rearwardly located husker unit 21, and interconnecting, laterally disposed side elevators or snapped ear conveyors, designated respectively and generally at 22 and 23. The picker unit 20 will first be described and it will be noted that the same is located at the front and sides of the tractor in what may be described as a wrap-around fashion for supporting oppositely located picking mechanisms 24 and 25 by which adjacent rows of corn passing immediately alongside the body or chassis of the tractor may be picked as the machine advances over the field. Each picking assembly 24—25 is identical in its construction, aside from its left hand-right hand location of corresponding parts, and each mechanism comprises elongated, upwardly and rearwardly angling snapping rolls 26 rotatably carried in side frames, indicated generally at 27. Such frames are triangular, as viewed from the side, and are made up of angle irons and suitable connecting sheeting in accordance with present day agricultural machinery manufacturing methods. In addition to supporting the snapping rolls 26 these frames also carry gathering chains, presently to be described, and support a centrally located and forwardly tapering center snout 28 and opposed gathering points 29 by which the corn is guided into proper engagement with the picking mechanisms. Referring to Fig. 2 it will be noted that there is a U-shaped inner frame element 30 having a forwardly located rounded bight 30a which connects the frames 27 and it is this frame element which extends around in wrap-around relation to the fore part of the tractor, as clearly seen. In addition to this connection between the frames at the opposite sides of the tractor there is a lower transverse frame assembly, appearing in Fig. 7 and designated generally at 31, which is located below the tractor and is of any suitable construction in order to properly tie these assemblies together. It is, however, to be noted that this cross framing 31 includes a centrally located platform plate 32 over which the front wheels B of the tractor may travel when the same is run into or out of the picker unit, as will be later described in detail. Referring again to Fig. 2 it will be seen that the respective picking mechanisms 24—25 are located between oppositely, downwardly sloping guide sheets 33 forming part of the sheet metal assembly terminating in the aforesaid snout 28 and gathering points 29, as is customary in corn pickers, and further that, in accordance with the usual practice, there are provided side shields 34 hinged at 35 to normally hang downwardly and conceal and protect operating elements of said mechanisms which are located at the opposite outer sides of the frames 27.

Near their lower rear corners the frames 27 are fitted with heavy cross sleeves 36 which are secured to an elongated tubular support and pivot shaft or cross shaft 37 which connects the opposite lateral assemblies and projects for some distance at each end beyond the side frames 27. The shaft 37 forms the support between the picker unit and the tractor and for this purpose the tractor, as seen in Fig. 6, is provided with a heavy bracket 38 at each side securely bolted to the chassis F under the aforesaid flanges H, as designated at 39. Most tractors are provided with suitable attaching surfaces for brackets of this nature which are used in supporting various types of mounted equipment, and for our purpose the aforesaid brackets 38 angle downwardly and rearwardly and are provided at their lower rear ends with downwardly opening notches which form bearings 40. Inverted U-shaped bearing saddles 41 are welded in these notches 40 and the shape and size of these saddles are such that the aforesaid shaft 37 may fit upwardly thereinto for free rotary motion with respect to the brackets. When assembled the shaft 37 is then held upwardly into place, against downward displacement, by means of lower bearing blocks 42 arcuately surfaced on their upper sides to engage the shaft and held in place in the saddles 41 by means of bolts 43, as clearly shown. Thus the shaft 37 held in place in the brackets 38 forms a transverse pivot connection as well as a support for the rear end portion of the picker unit 20, about the axis of which the forward end of the said unit may be swung upwardly and downwardly as necessary to accommodate it to varying crop conditions.

Such movement of the picker unit is brought about hydraulically by the actuation of the fluid motor M to oscillate the lifting roll L and for this purpose each side frame 27 is provided with a generally upwardly extending lever 44 in the form of an angle iron bolted at 45 to the rear end portion of the frame, as seen in Fig. 7. The upwardly projecting ends of the levers 44 are then connected by links, designated generally at 46, to levers 47 which are bolted to the aforesaid lifting roll L at properly spaced locations. One of the aforesaid links 46, as best seen in Fig. 3, is actually a turn buckle 48 which is pivoted at its opposite ends 49 and 50 to the respective levers, whereas the other link is not adjustable as to length but has corresponding pivot connections to the levers. The turn buckle construction 48 for one of the links permits the effective length thereof to be adjusted for transverse leveling of the picker unit, as will be readily appreciated.

The details of the picking mechanisms 24 and 25, as well as the drive mechanisms therefor, will be presently described.

Turning next to the husking unit 21 the same comprises a generally rectangular open, box-like frame 51 including lower cross members 52 and upright corner members designated throughout at 53, the frame being, of course, suitably braced by appropriately located bracing as will be understood. Located in the lower part of the frame is a transversely operating conveyor 54 which discharges the husks and other waste material to the ground at one side of the machine, and located thereabove is a husking bed indicated generally at 55 serving the usual function of stripping the husks from the corn. Said husking bed comprises a series of cooperating husking rolls 56 rotating on transverse axes, and as shown in Fig. 11, sloping from the right to the left hand side of the machine. The ears of corn from which the husks have been stripped fall from the lowermost, laterally disposed end of the husking bed 55 into a hopper 57 supported at one side of the frame 51 (see Fig. 11) and are delivered to the lower end of an upwardly, rearwardly extending wagon elevator 58 for delivery to a wagon or truck following the picker. The elevator 58 may be of conventional construction and is supported at its forward end alongside frame 51 and suitably braced and suspended at its rear elevated end by brace rods, designated collectively at 59. At one end the husking rolls 56 are driven by a series of meshing gears 60 in the conventional manner, so that adjacent rolls will rotate in opposite directions.

Turning now to the manner in which the husking unit 21 is mounted upon the tractor, it will be noted that the frame 51 includes a pair of transversely spaced and longitudinally extending sills or channels 61 secured to the aforesaid lower cross members 52 and projecting forward from the frame for a considerable distance. The forward projection of these sills 61 is such that with the husking unit 21 properly located at the rear of the tractor the forward ends of the sills will extend alongside the lower rear corners of bracket or attaching plates 62, which are bolted at 63 to lugs 64 upon the rear axle housing E of the tractor at each side. Furthermore, the forward ends of the sills 61 and the corners of the plate 62 are provided with registering apertures 65 through which may be mounted pins 66 for connecting the parts. The pins are preferably provided with cotter keys 67 (Fig. 8) but, of course, bolts or other appropriate fasteners may be substituted if desired. In order then to support the weight of the husking unit 21 and to prevent it from simply swinging downward about its connections to the plates 62, turn buckles 68 are provided at each side and they angle from the junction of the sills 61 and adjacent lower corner of the frame 51 forwardly and upwardly to points above the aforesaid axle housing E. The rearmost threaded screws 69 of said turn buckles are welded or otherwise firmly secured at the proper angle to clips 70 upon the frame of the husker, whereas the forward screws 71 are welded to straps 72 which are pinned or otherwise fastened at 73 to upper bracket or attaching plates 74 held upon the axle housing lugs 64 by the aforesaid bolts 63. Preferably, and as best seen in Fig. 4, the straps 72 are also fitted with clips 75 so that the forward ends of the turn buckles are bifurcated to facilitate rigid connection to the bracket plate 74 and obviously the adjustment of the overall length of the turn buckles 68 will permit the husking unit 21 to be properly leveled and supported at the rear of the tractor.

Torque for the operation of all of the working parts of the picking and husking units and the various conveyors and elevators is taken from the aforesaid power take-off shaft J through a drive connection, designated generally at 76, including a pair of universal joints 77, 78 which may be connected by telescoping shaft elements 78a–78b, such telescoping of the shaft elements permitting them to be simply slipped apart as the husking unit is removed from the tractor, as will be later described. The rearmost universal joint 77 is secured to a countershaft 79 journaled forwardly and rearwardly through the frame 51 of the husking unit below the aforesaid conveyor 54 in suitable bearings 80. By various pulleys and sprockets, the precise arrangement of which is immaterial to an understanding of the present invention, power is then transmitted from this countershaft 79 for the operation of the conveyor 54, the husking rolls 56, the wagon elevator 58 and other parts making up the husking unit assembly, such drives being designated throughout and collectively at 81. Of importance to the present invention, however, it will be noted that torque is also taken from the countershaft 79 through a sprocket chain 82 for the operation of short stub shafts 83 carried in bearing hangers 84 suspended from the husking unit frame 51 at each side thereof and immediately within the aforesaid sills 61. It is from these shafts 83 that the power is taken for the operation of the various gathering chains and snapping rolls for the picking unit 20 and at each side there is a drive connection made up of a pair of universal joints 85, 85a having telescoping shaft elements 86, 86a, which also will slide apart as the husking unit is removed from the tractor. Each drive assembly angles upwardly and forwardly below the axle of the tractor, with the rearmost universal joints 85 secured to the shaft 83, and the forward universal joints 85a are secured to a gear box or drive unit 87 fastened to each lower rear corner of the frame 27 previously described. For safety's sake the various draft connections will, of course, be properly shrouded or enclosed and, for example, it will be noted that the rear portions of the drive shafts 86 operate within box-like shields 88 secured to the husking unit. Details of such shields are, of course, not important and much of the shielding is omitted to better disclose the construction and arrangement of the parts.

Referring at this point to Fig. 11 is will be noted that the upper portion of the husker unit 21 includes a pair of receiving hoppers 89 and 90 made up of sheet metal, with upright outer sides 91 terminating in inwardly and downwardly converging lower walls 92, 92a. At the front the hoppers 89 and 90 have openings into which project the upper rear ends of the side elevators 22 and 23 so that corn carried by these elevators will be dropped directly back into the hoppers, the said openings being designated at 93. It is, of course, necessary that the ears of corn delivered by the elevators 22 and 23 be all delivered to the higher, receiving end of the husking bed 55 and at the one side the aforesaid bottom 92 of the hopper 89 will deliver directly to this end of the husking bed. At the opposite side, however, the corn from elevator 23 is guided by the bottom 92 of the hopper 90 onto the upper flight 94 of a raddle-like conveyor, designated generally at 95, located above the husking bed 55 and running over head sprockets 96 at one side of the husking unit, above the higher end of the husking bed. At the opposite side the conveyor 95 operates over vertically spaced idler sprockets 97 and 98, the purpose being to bring the lower flight 99 of the conveyor into substantially parallelism with the husking rolls 56. Torque is transmitted to the aforesaid drive connections 81 to the head sprockets 96 in such fashion that the upper flight 94 of the conveyor will move from left to right, or in the direction of the higher end of the husking bed 55 as indicated by the arrow in Fig. 11, and thus the conveyor will deliver corn from the hopper 90 to the proper end of the husking bed where it will be mingled with the corn from the hopper 89. At the same time the lower flight 99 of the conveyor will act as a hold-down apron to keep the ears of corn in proper contact with the husking rolls 56 in the manner of all such aprons now customarily used. Thus the conveyor 95 has the dual function of traversing the corn from the hopper 90 for delivery with the corn from the hopper 89 and assisting in the husking operation. In order to provide vertical yieldability the end of the conveyor 95 carried by the idler sprockets 97 and 98 is yieldably suspended by retractile coil springs 100 attached to an upper cross member 101 which is part of the husking unit frame, as indicated at 102. The aforesaid idler rolls 97 and 98 are carried by hanger plates 103 and these are in turn suitably guided in the husking unit frame and suspended from the springs by the connection 104.

Aside from the mounting and the drive connections from the side elevators 22 and 23 the foregoing completes the construction of the husking unit 21 and at this point attention is again called to the construction of the picking unit 20.

As previously described each of the picking assemblies 24 and 25 comprises a pair of snapping rolls 26, the tapered forward extremities of which are suitably supported in bearings at lower forward corners of the frames 27 and torque is transmitted to the upper rear ends of these rolls by suitable drive chains, designated collectively at 105, from upwardly, rearwardly angling stub shafts 106 which merge from the aforesaid gear boxes 87. The mounting and drive for these snapping rolls are both largely conventional and need no detailed description herein. In addition, the picking assemblies or mechanisms 24 and 25 each comprises a plurality of inner and outer gathering chains which are also conventionally arranged and driven from the aforesaid gear boxes 87. For the sake of brevity the outer gathering chains are simply denoted collectively at 107 and at this point the inner gathering chains are also designated at 108. As will presently appear, however, the inner gathering chains 108 are arranged in a novel fashion in order to provide proper clearance for steering movements of the front wheels B of the tractor. The operation of the snapping rolls 26 and gathering chains 107—108 is, of course, such as to snap the ears from the rows of corn passing immediately alongside the tractor and the snapped ears fall through suitable openings, appearing at 109—110 in Fig. 2, at the rear portions of the mechanism and into the forward receiving ends of the side conveyors 22—23, from whence the snapped ears are delivered into the aforesaid hoppers 89—90 of the husking unit.

These conveyors 22—23 include elongated, trough-like housings 111 opening upwardly, and within the housings there operate conveyor chains 112 carrying paddles or raddles 113 to engage and move the corn lengthwise of the said housings. At the lower ends the housings 112 are provided with saddle-like brackets 114 which open downwardly and forwardly to slip over the exposed ends of the support and pivot shaft 37 outwardly of the frames 27, as best seen in Fig. 10. The brackets 114 thus support the side elevators 22—23 against downward or forward motion with their receiving ends properly located below the openings 109—110 and when in operation the elevators are also locked against upward or rearward displacement by means of pin 115 (Fig. 10) which project through the opposite, uper and lower portions 116 and 117 of the brackets forward of said shaft 37. Here again the pins 115 are provided with cotter keys 118 but any other suitable fastening may be provided. Adjacent their upper, rear ends the housings 111 for the respective elevators 22—23 are provided at their sides with bracket plates 119 adapted to interfit with forwardly projecting ears 120 upon the upper, forward corners of the husking unit housing 51, and suitable pins or bolts 121 are then used to supportably connect the bracket plates and ears. The conveyor chains 112 are driven by head sprockets 122 at the upper ends of the elevators, which are conventionally carried in suitable chain tighteners 123 and upon stub shafts 124 journaled through said tighteners, as best seen in Fig. 11. At one side of the machine the associated shaft 124 projects outward for connection thereto of a drive chain 125 powered from the countershaft 79 and at their inner ends both of said shafts 124 are fitted with pins 126 with which may be engaged the slots 127 at the hollow ends of a connecting shaft 128, so that both elevators will operate in unison. The pin and slot connections 126—127 permit the side elevators to be taken apart conveniently, as will be later described.

As stated hereinbefore, the inner gathering chains 108 forming part of the picking mechanisms 24 and 25 have a novel arrangement and mounting such that they will clear the steerable front wheels B of the tractor. All of the gathering chains are provided with outwardly extending lugs, designated collectively at 129, the conventional purpose of which is to grasp the corn stalks and work them back between the snapping rolls 26, and in the case of the inner chains 108 they are each operatively arranged about front and rear sprockets 130 and 131 suitably journaled and supported in parts of the side frames 27, as best seen in Fig. 12. These lugs 129 normally project inwardly toward the tractor and so restrict the permissable steering movements of the wheels B. Because these lugs 129 are used it is also impossible to employ an ordinary idler sprocket which might be used to guide the inner runs of the chains or, in effect, to spread them apart to provide greater clearance for the wheels. Accordingly we provide arcuate guides 132 for the inner runs of the chains, which guides are welded or otherwise secured to bracket plates 133 which form parts of the aforesaid frames 27. Each such guide 132 is channel-shaped in cross section with upper and lower webs 134 spaced apart to clear the chain links and these webs are provided with guide ribs 135 projecting respectively upwardly and downwardly to overlie the corresponding edges of the chain links while clearing the lugs 129 as seen in Fig. 13. Thus the ribs 135 will hold the inner runs of the chains 108 apart to increase the clearance between them, as clearly indicated in Fig. 12, and without interference with the travel of the lugs 129. In practice the guides 132 are located in a plane immediately to the rear of the tractor front wheels B and, to further preclude the wheels from coming into contact with the chain lugs, wheel bumpers 136 are located immediately within the forward ends of the chains and secured by brackets 137—138 to the side frames of the picker. The bumpers 136 are suitably formed up from tubing or the like so that they will provide a smooth surface against which the edges of the wheels B may bump and rub if the wheels reach the limit of their steering motion to either side, and the forward ends 136A of the bumpers are curved in an outward direction as clearly shown. In addition to preventing any damage to the parts this relative arrangement of the gathering chains with their guides 136 is important since it makes it possible to construct a machine with the snapping rolls 26 set at the proper gentle slope for best operation, without unduly lengthening the machine overall which would impair its maneuverability. In order to clear the front whels of the tractor other machines of this general nature have used very sharply sloping picking mechanisms and snapping rolls and as a result they have sacrificed picking efficiency and made necessary the use of snapping rolls which are shorter than is desirable.

The support and pivot shaft 37 projects outwardly beyond the side elevators 22—23 some distance, as best seen in Figs. 9 and 10, and fitted upon each of these exposed ends is a collar 139 firmly secured in place by means of a bolt 140. A jack fitting in the form of a forked bracket plate 141 is rigidly secured to each of said collars 139 by means of suitable brackets and gusset plates 142 and said bracket plate 141 has a forwardly opening notch 143 into which the threaded shaft 144 of a conventional screw jack may be fitted. Such jack includes a handle 145 and base 146 as well as the usual lift nut 147 which will lock against rotation within a depending socket 148 in such fashion that rotation of the jack screw will elevate the shaft 37 and the parts associated therewith. At each side the bracket structure for the jack is tied to the forepart of the adjacent side frame 27 by the tie bar 149 provided at its rear end with a screw 150 engaging the bracket so that the tie bar may be pulled taut.

The operation of the machine, insofar as its normal function of picking and husking the corn, will be quite obvious with the ears of the two adjacent crop rollers passing immediately alongside the tractor being delivered by means of the side conveyors 22—23 into the hoppers 89—90, from which the ears will be directed onto the husking bed 55, while the husks and silks stripped from the ears by the husking rolls 56 are dropped by the conveyor 54 back onto the field and the husked ears are guided by the chute 57 onto the wagon elevator 58, as previously described. Since the entire assembly is arranged in a wrap-around fashion about the tractor, it is not only readily maneuverable but conveniently transported from field to field without disassembly, in addition to which the operator is so located that he may conveniently observe the proper functioning of all of the working assemblies.

As pointed out hereinbefore the mounting of all of the component parts of the picker upon the tractor reduces the total cost for the picker itself as compared to ordinary pull-behind or self-propelled equipment and the tractor, when not in use with the picker, may be used for all other purposes for which it is normally used. To be practical, however, it is necessary that the main component parts of the corn picker be readily mounted upon or dismounted from the tractor with a minimum of time and labor involved in this operation. The assembly as disclosed herein admirably meets these qualifications. For example, assuming that the picker is to be dismounted from the tractor, the first operation is the removal of the side elevators 22—23 for which purpose the drive chain 125 which drives both elevators is removed and laid aside, following which the pins 115 and 121 are removed. This operation frees both ends of the elevators and they are light enough to be readily lifted out and laid aside. In so doing the shaft 128 is, of course, freed from the drive pins 126, and this shaft is also laid aside. The second operation consists of the placing of horses or other supports beneath the sills 61 of the husking unit 21, following which the turn buckles 68 are loosened until the weight of the husking unit is rested upon these supports. The pins 66 and 73 are then removed at each side and the tractor itself may be driven forwardly leaving the husking unit at rest upon the supports, as will be readily understood. The drive shafts 76 and 86 being, as aforesaid, of telescoping construction will simply slide apart as the tractor moves forward away from the husking unit and parts of these shafts will remain in connection with the husking unit while others will remain attached to the power take-off shaft J and to the gear boxes 87. The final operation consists in lowering the picker unit 20 to the ground by operation of the power lift, whereupon the jack screws 144 are connected with the bracket plates 141 and turned up so that the weight of the rear end of the picker assembly is lifted from the bearing blocks 42. The pins 43 are then removed so that the bearing blocks 42 will drop clear, following which the jack screws 144 are operated to lower the rear end of the picker unit to the ground, it being of course understood that prior to this operation the lift links 46 will have been disconnected from the levers 44. The entire picker assembly now rests upon the ground and the tractor may be backed out with the front wheels B rolling rearwardly over the platform plate 32 so that the tractor is ready for other operations. Of course the various lift and power take-off connections are removed and laid aside if the picker is not to be used for some time, but in general the picker unit dismounts into four main parts made up of the picker 20, the side elevators 22—23 and the husking unit 21. To mount the machine upon the tractor the operations are in general the reverse of those just described, the tractor being first driven into the picker unit which is then raised by the jack screws 144 so that the bearing blocks 42 may be reinstalled and the power lift connections remade. Secondly, the tractor is backed up to the husking unit resting upon its supports, or horses, until the pins 66—73 may be reinstalled and the drive shafts retelescoped, following which the turn buckles 66 will be tightened to slightly elevate the husking unit and permit the removal of the supports. Finally the side elevators and their drive shaft and chain are replaced. It is obvious that all of these operations may be carried out without heavy lifting on the part of the operator and with a minimum of time required for either mounting or dismounting the machine.

Farmers following modern agricultural practices are increasing picking and immediately shelling their corn, where circumstances permit, instead of picking and husking and then storing the crop in the ear.

There are obvious advantages in this and according to our invention this picking-shelling process may be carried out as a continuous action in the field merely by removing the husking unit 21 and substituting therefor a shelling unit designated generally at 152 as will now be described.

Reference is had to Figs. 14–18 in this description and wherever previously described and identified elements of the corn picker assembly and tractor appear unchanged in these views, they are designated by the previously used reference characters.

Said unit 152 is similar in general configuration and framing to the husking unit 21 which it replaces in changing from picker-husker to picker-sheller and like that unit has longitudinal base sills or channels 153 which extend forwardly for attachment by the aforesaid pins 66 to the brackets 62 secured to the tractor rear axle housing E. Also bracing is provided to hold the shelling unit 152 upward to position by links 154 extending upward and forward from the front lower edge of the unit for attachment as aforesaid by the pins 73 at points above the axle housing E. These links 154 may well take the form of turnbuckles such as those previously described and identified at 68.

The operating elements of the shelling unit 152 are largely conventional and will be described herein only in such detail as to permit an understanding of their general functioning and assembly into the unit. These elements are located in and upon a generally rectangular box-like frame assembly 155 made up of suitable framing and panel parts including four upright corner posts 156 extending upward from front and rear cross bars 157 secured across the aforesaid sills 153. As heretofore described the forward corner posts are here again provided with apertured ears 158 near their upper ends to receive the pins 121 removably mounting the upper rear ends of the side elevators 22—23, these elevators being located and functioning exactly as earlier described and having their rear delivery ends extending over the upper end of the frame 155. Thus the snapped ears of corn delivered by the elevators as the machine travels over the field are dropped down into the upper end of the picking unit frame near the opposite sides thereof. At one side (the right as here viewed) the corn falls from the elevator 22 directly into a receiving hopper 159 located at this side of the shelling unit but the corn from the elevator 23 at the opposite side falls onto an endless apron cross conveyor 160 operating over rollers 161—162 one at this side of the machine and the other adjacent the hopper. These rollers 161—162 are located between the front and rear upright sides 163—164 of a conveyor housing constituting the upper part of the unit and the upper flight of the conveyor which, of course, moves to the right, delivers the corn into the receiving hopper 159 combining the corn from both elevators 22—23 in a single stream. Hopper sides 165—166 and 165a—166a guide the corn from elevator 23 down upon the conveyor apron and escape of the ears off the left end of the conveyor is prevented by a hanging forward and rearwardly extending guard 167. This structure is best seen in Figs. 17 and 18 and it will be noted that both the husking and shelling units 21 and 152 have in common the use of a conveyor for joining the streams of corn from both elevators 22—23 and delivering the crop at one side of the unit. Also in common is the fact that the operating elements which operate upon the corn thus delivered are arranged crosswise with reference to the direction of travel of the machine.

Thus the usual main drive shaft 168, cylinder 169 and cage 170 common in cylinder-type corn shellers are located upon a transverse, horizontal axis, the shaft extending outward through a bearing structure 171 on the right side panel 172 of the unit while the opposite end, which falls considerably short of the left side of the unit is rotatably carried in a bearing 173 suspended from the top 174 of the sheller housing proper, and a forwardly-rearwardly extending support angle 175. The cylinder 169, as it is generally called in this field, includes irregularly shaped lugs of carefully designed and now widely known arrangement designated generally at 176. These lugs, as the corn falls from the hopper, roll the ears about upon the longitudinally extending, spaced bars making up the cage 170, to strip the husks and silks from the ears and then shell the kernels from the cobs. The kernels falling through the cage bars are guided by angularly extending deflector sheets 177—178, which are carried between the front and rear panels 179—180 of the sheller unit frame, onto the usual oscillatably mounted cleaning shoe 181 which includes a reticulated or perforated sieve 182. Said sieve 182 is located above the closed bottom 183 of the shoe and this bottom slopes downward toward the right to deliver the sieved, shelled corn to a forwardly-rearwardly extending auger housing 184 near the right lower corner of the unit. Operating in the housing 184 is a feed auger 185 which delivers the corn into the lower end of any suitably arranged, upwardly delivering elevator 186. As here shown this elevator 186 has the usual housing 187 communicating with the delivery end of the auger 185 and secured, as by suitable bracketing 187a to the rear of the sheller unit, An endless bucket or paddle-type elevator (not shown) operates in the housing 187 to elevate the corn and the elevated corn may in turn be delivered by a rearwardly extending and suitably braced and supported tubularly enclosed delivery auger 188 to a wagon or truck (not shown, of course) trailing behind the machine. Parts of the tripod-like bracing for the delivery auger 188 and its tubular housing 189 are designated at 190 in the drawings.

The cobs after removal of the kernels (and of course the husks and silks) are delivered toward the left through a cob gate 191 (Fig. 18) onto a transversely oscillating or reciprocating cob rack 192 from the left end of which they are discharged onto the ground alongside the machine, through a discharge opening 193 in the hooded left side 194 of the frame 155. A rotary cleaning fan 195 is located in a fan housing 196 suspended from the lower right corner of the machine, and its discharge duct 197 angles upwardly and leftwardly to direct the air through the corn upon the sieve 182, thus to clean the corn as usual. The air blast also assists in blowing out the cobs, husks and silks as will also be apparent.

Some kernels of corn will, of course, remain in the material issuing through the cob gate 191 and these, along with other particles which fall through the cob rack 192 are collected and re-run through the sheller. For this purpose there is provided (Fig. 18) an upwardly opening, forwardly-rearwardly extending auger housing 198 below the cob delivery end of the sheller and a rotary auger 199 operates therein to feed this material into the lower end of a return elevator 200 located at the rear of the unit. Said elevator 200, again of the usual endless bucket or paddle-type, the actual mechanism of which is not shown but is enclosed in a housing 201 held by a bracket 202 upon the rear of the unit, delivers the material to a downwardly and forwardly angling chute 203 from which the material falls onto the conveyor apron 160 and thus is run through the sheller again.

For driving the various operating elements of the sheller suitable connection is again made to the power take-off shaft of the tractor through a universally jointed, telescoping drive connection like that previously described, the same being here only partially shown at 204. A sprocket chain 205 driven by the rear portion of this drive connection 204 drives a main counter shaft 206 extending forwardly-rearwardly through the sheller unit and at its rear end this countershaft drives the cleaning fan 195 by means of a belt 207 and pulleys 208 (Fig. 16). Also on the rear end of this countershaft is a sprocket driving a chain 209 operating a shaft 210 which is located above the cleaning shoe 181 and which is suitably, conventionally arranged to actuate the shoe and cob rack 192. Still another sprocket at the rear end of the countershaft 206 drives a sprocket chain 211 and this chain operates over suitable idler sprockets 212—213 and over sprockets 212a—213a at the head of the elevator 186 and upon the end of the auger 188 to drive these corn delivery elements. The conveyor roller 162 has a rearwardly extending shaft 214 and the same is driven by a belt 215 from the shaft 210 while another belt 216, held taut by the belt tightener pulley shown at 217, is connected to drive the conveyor 200 which returns material for re-running through the sheller. In any suitable fashion torque is also transmitted to the main shaft 168 where it projects at the right end of the unit, a part of such drive mechanism being illustrated as the chain 218 connecting a countershaft 219 to said main shaft. Another chain 220 connects the countershaft 219 through an automatic safety clutch 221 to the shaft 124 of the adjacent side elevator 22, there again being the detachable shaft connection 128 between the two elevators to drive them in unison as previously set forth in detail. It is not believed that further description of the drive mechanism should be necessary herein. A guard 222 normally encloses the chains 211—220 at the side of the unit but is omitted for clarity in Figs. 17 and 18.

The operation of the sheller unit is, of course, largely conventional except for the fact that it is located crosswise of the line of travel and the cobs are delivered upon the ground from one side of the unit. Also the operations of assembling and disassembling the picker-sheller unit with reference to the tractor is exactly the same as heretofore described, the shelling unit simply taking the place of the husking unit.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. A two-row tractor mounted corn picker for a tractor having front and rear wheels and a longitudinally extending chassis, comprising a corn picking unit having a picking mechanism extending longitudinally along each side of the tractor, each said corn picking mechanism including a side frame, a cross shaft extending transversely beneath the tractor chassis between the axes of the front and rear wheels of the tractor, means on said side frames securing both to the cross shaft, a bracket secured on each side of the tractor chassis and each bracket having bearing means engaging the cross shaft, adjustable means for holding the picking mechanisms against movement about the axis of the cross shaft, the said cross shaft extending at its ends outwardly beyond the side frames, side elevators extending rearwardly from the picking mechanisms alongside the tractor, and bracket means on the forward end portions of the side elevators supportably engaging the outer end portions of the cross shaft to support the side elevators thereon.

2. A two-row tractor mounted corn picker for a tractor having front and rear wheels and a longitudinally extending chassis, comprising a corn picking unit having a picking mechanism extending longitudinally along each side of the tractor, each said corn picking mechanism including a side frame, a cross shaft extending transversely beneath the tractor chassis between the axes of the front and rear wheels of the tractor, means on said side frames securing the same to the cross shaft, a bracket secured on each side of the tractor chassis and each having a bearing means receiving the cross shaft and retaining the shaft and the associated picking mechanisms on the tractor, levers extending upwardly from the side frames, means for swinging said levers forwardly and rearwardly and pivoting the picking mechanisms in unison on the axis of the cross shaft to raise and lower the forward ends of the said mechanisms with respect to the tractor, the said cross shaft extending at its ends outwardly beyond the side frames, side elevators extending rearwardly from the picking mechanisms, and saddle-shaped brackets on the forward end portions of the side elevators supportably engaging the outer end portions of the cross shaft to support the side elevators thereon.

3. A two-row tractor mounted corn picker for a tractor having front and rear wheels and a longitudinally extending chassis, comprising a corn picking unit having a picking mechanism extending longitudinally along each side of the tractor, each said corn picking mechanism including a side frame, a cross shaft extending transversely beneath the tractor chassis between the axes of the front and rear wheels of the tractor, means on said side frames securing the same to the cross shaft, a bracket secured on each side of the tractor chassis and each having a downwardly opening saddle forming a bearing for reception of the cross shaft, removable bearing blocks in said saddles upwardly engaging the cross shaft and retaining the shaft and the associated picking mechanisms on the tractor, levers extending upwardly from the side frames, means for swinging said levers forwardly and rearwardly and pivoting the picking mechanisms in unison on the axis of the cross shaft to raise and lower the forward ends of the said mechanisms with respect to the tractor, the said last mentioned means including links connected to the upper ends of the levers and one of said links being adjustable in length to level the picking unit in a transverse plane, the said cross shaft extending at its ends outwardly beyond the side frames, side elevators extending rearwardly from the picking mechanisms, and saddle-shaped brackets on the forward end portions of the side elevators supportably engaging the outer end portions of the cross shaft to support the side elevators thereon.

4. A two-row tractor mounted corn picker for a tractor having front and rear wheels and a longitudinally extending chassis, comprising a corn picking unit having a picking mechanism extending longitudinally along each side of the tractor, each said corn picking mechanism including a side frame, a cross shaft extending transversely beneath the tractor chassis between the axes of the front and rear wheels of the tractor, means on said side frames securing the same to the cross shaft, a bracket secured on each side of the tractor chassis and each having a bearing for reception of the cross shaft and retaining the shaft and the associated picking mechanisms on the tractor, means for adjusting the picking mechanisms in unison on the axis of the cross shaft to raise and lower the forward ends of the said mechanisms with respect to the tractor, the said last mentioned means including links connected to the upper ends of the levers and one of said links being adjustable in length to level the picking unit in a transverse plane, the said cross shaft extending at its ends outwardly beyond the side frames, side elevators extending rearwardly from the picking mechanisms, downwardly and forwardly opening saddle-shaped brackets on the forward end portions of the side elevators supportably engaging the outer end portions of the cross shaft to support the side elevators thereon, and pins removably mounted through said saddle-shaped brackets below and forwardly of said cross shaft to retain the side elevators in position.

References Cited in the file of this patent

UNITED STATES PATENTS

| | | |
|---|---|---|
| Re. 23,083 | Andrews et al. | Feb. 8, 1949 |
| 1,806,624 | Glover et al. | May 26, 1931 |
| 1,925,077 | Lindgren et al. | Aug. 29, 1933 |
| 1,948,917 | Hitchcock | Feb. 27, 1934 |
| 2,011,925 | Benjamin | Aug. 20, 1935 |
| 2,160,486 | Oehler et al. | May 30, 1939 |
| 2,379,803 | Hyman | July 3, 1945 |
| 2,507,711 | Hardy et al. | May 16, 1950 |
| 2,513,941 | Hyman | July 4, 1950 |
| 2,518,302 | Gerber | Aug. 8, 1950 |
| 2,554,198 | Kuhlman | May 22, 1951 |
| 2,565,815 | Heikens | Aug. 28, 1951 |
| 2,641,887 | Korsmo | June 16, 1953 |